(12) United States Patent
Morrison

(10) Patent No.: US 7,151,912 B1
(45) Date of Patent: Dec. 19, 2006

(54) CABLE RETRACTOR FOR AN ELECTRONIC DEVICE

(76) Inventor: Mark D. Morrison, 666 W. End Ave., Apt. 19J, New York, NY (US) 10025

( * ) Notice: Subject to any disclaimer, the term of this patent is extended or adjusted under 35 U.S.C. 154(b) by 1077 days.

(21) Appl. No.: 09/707,814

(22) Filed: Nov. 7, 2000

(51) Int. Cl.
H04B 1/38 (2006.01)
(52) U.S. Cl. ............... 455/90.3; 455/569.1; 455/575.1; 455/575.2; 455/575.6
(58) Field of Classification Search ............... 455/90, 455/557, 568, 569, 573; 379/430, 431, 433.01, 379/433.02, 438; 381/370, 374, 376, 379, 381/380, 384–387, 395; 242/385.4
See application file for complete search history.

(56) References Cited

U.S. PATENT DOCUMENTS

| | | | |
|---|---|---|---|
| 4,940,859 A | 7/1990 | Peterson | 191/12.4 |
| 4,989,805 A | 2/1991 | Burke | 242/107.1 |
| 5,148,471 A * | 9/1992 | Metroka et al. | 455/563 |
| 5,156,242 A | 10/1992 | Ditzig | 191/12.2 |
| 5,241,593 A | 8/1993 | Wagner | 379/438 |
| 5,299,670 A | 4/1994 | Willard | 191/12.2 |
| 5,511,120 A * | 4/1996 | Hirata et al. | 379/433.02 |
| 5,535,960 A | 7/1996 | Skowronski et al. | 242/378.4 |
| 5,564,082 A * | 10/1996 | Blonder et al. | 455/575.6 |
| 5,581,821 A | 12/1996 | Nakano | 2/422 |
| D380,476 S | 7/1997 | Zochert et al. | D14/249 |
| D385,876 S | 11/1997 | Park | D14/138 |
| 5,706,353 A * | 1/1998 | Arai et al. | 381/77 |
| 5,724,667 A * | 3/1998 | Furuno | 455/575.2 |
| 5,796,822 A | 8/1998 | Larson et al. | 379/433 |
| 5,898,933 A * | 4/1999 | Kaschke | 455/575.7 |
| 6,059,081 A | 5/2000 | Patterson | 191/12.2 R |
| 6,059,213 A | 5/2000 | Phillips | 242/378.4 |
| 6,082,656 A * | 7/2000 | Thornton | 242/385.4 |
| 6,086,007 A | 7/2000 | Till | 242/381 |
| 6,094,496 A * | 7/2000 | Stowers, Sr. | 381/362 |
| 6,094,565 A * | 7/2000 | Alberth et al. | 455/575.3 |
| 6,131,042 A | 10/2000 | Lee et al. | 455/556 |
| 6,144,864 A * | 11/2000 | Lands et al. | 455/569.1 |
| 6,370,401 B1 | 4/2002 | Baranowski et al. | 455/569 |
| 6,374,126 B1 * | 4/2002 | MacDonald et al. | 455/569.1 |
| 6,587,674 B1 * | 7/2003 | Isberg et al. | 455/90.1 |
| 6,633,770 B1 * | 10/2003 | Gitzinger et al. | 455/575.1 |

FOREIGN PATENT DOCUMENTS

JP 11-163989 * 6/1999

* cited by examiner

Primary Examiner—Temica Beamer
Assistant Examiner—Joy Contee
(74) Attorney, Agent, or Firm—Hayes Soloway PC

(57) ABSTRACT

A cable retractor assembly is capable of retracting a cable onto a rotatable reel, the rotatable reel being urged to rotate in a predetermined direction by a biasing force. A moveable actuator when located in a first position is capable of overcoming the biasing force that urges the cable to be wound onto the reel. When the moveable actuator is in a second position, the moveable actuator does not impede the biasing force The retractor assembly may be integrated into or detachably secured to a portable electronic device. A sensor within the cable retractor assembly can detect when the reel rotates or the cable is extracted and thereby signal a coupled communications device to pick up an incoming call. The cable retractor assembly further comprises a pick-up actuator that when actuated signals a coupled communications device to pick up an incoming call.

23 Claims, 8 Drawing Sheets

CABLE RETRACTOR FOR AN ELECTRONIC DEVICE

FIELD OF THE INVENTION

The present invention relates to a cable retraction assembly for use in a device such as a cell phone, or other related communications device or any device for delivering audio information.

BACKGROUND OF THE INVENTION

Portable electronic devices such as AM/FM radios, cassette player, CD players, and MP3 players may utilize an earpiece at the end of a flexible cable to allow the user to listen to the radio or prerecorded music without disturbing surrounding people. Some earpieces also incorporate a microphone for use with a wireless phones. These earpieces come in many different sizes and configurations and are available at different price points and quality levels. Many users attach these portable electronic devices about their waistline and listen through the earpiece. The earpiece is coupled to the portable electronic devices with a predetermined length of cable.

A problem with these earpieces is that no one predetermined length of cable is right for each user and activity. In order to ensure there is enough cable length for every person and activity, the manufacturers typically provide an overly long cable. If a user finds that the length of cable is too long for his or her activity, the user must somehow reduce the amount of slack. The user can eliminate the slack by wrapping a portion of the cable around the electronic device until the appropriate length of cable remains or the user can coil the cable leaving an appropriate length of cable and secure the coil with tape or string. Both of these known methods do not allow the user the freedom to easily adjust the length of dispensed cable. The winding of the cable around the electronic device or into a coil can stress the wires inside the cable that may eventually lead to failure.

When the earpiece is not in use, the user must find a convenient location to store the earpiece and the associated length of cable. Often the user stores the earpiece in his or her pocket. If the earpiece is used in conjunction with a wireless phone and the user receives an incoming call, the user must quickly locate the earpiece and connect it to the phone in order to answer the call.

U.S. Pat. No. 4,989,805 entitled "Retractable Reel Assembly for Telephone Extension Cable" discloses a housing, which is adapted to be mounted to a wall in proximity to a telephone or telephone jack for utilization with either wall, mounted or table mounted telephones respectively. This device has a ratchet for selectively restraining rotation of the reel in one direction. The user can reel out an appropriate length of cable and then slowly release the cable to enable the locking mechanism. To recoil the cable, the user tugs on the cable and releases. The spring inside the housing then pulls the cable into the housing. A problem with this type of locking mechanism is that the mechanism is often difficult to engage. Another problem with a system like this is if the user accidentally tugs on the cable and releases, the cable will be uncontrollably recoiled into the housing. A further problem with systems like this is that the amount of dispensed cable is not infinitely selectable because the ratchet mechanism only has a fixed quantity of selectable positions.

A cable retractor for use with a cell phone is available from Safetone, Inc. of Fremont, Calif. The cable retractor includes an enclosure with a clip for attaching to a user's belt. An earpiece with a speaker is located at the end of a retractable cable. On the cable several inches from the speaker is a microphone. The retractor can be electrically connected to a cell phone with a separate, non-retractable cable. A drawback to this retractor is the cable retractor is a separate physical enclosure that cannot be mechanically coupled to the cell phone and the retractor takes up additional space on a user's belt or about their waistline. The non-retractable cable between the cell phone and the retractor can also get in the user's way.

SUMMARY OF THE INVENTION

The present invention is intended to overcome these disadvantages. Accordingly, it is an object of the present invention to provide a cable retractor that will allow the user to extract any length of cable quickly and easily.

It is a further object of the present invention to provide a cable retractor that can be coupled mechanically and electrically to an electronic device.

It is yet a further object of the present invention to provide a cable retractor that can be coupled to an existing electronic device and allow the electronic device to recharge without having to remove the cable retractor.

It is still a further object of the present invention to provide a cable retractor that is capable of signaling a coupled communications device to pickup an incoming call when the cable and/or speaker is extended.

It is still a further object of the present invention to provide a cable retractor that is capable of silencing an audible alarm signaling an incoming call when the cable is extended.

The above and other objects, feature, and advantages of the present invention will be apparent in the following Detailed Description of the Preferred Embodiments thereof when read in conjunction with the appended drawings

DETAILED DESCRIPTION OF THE PREFERRED EMBODIMENTS

Figure 1:
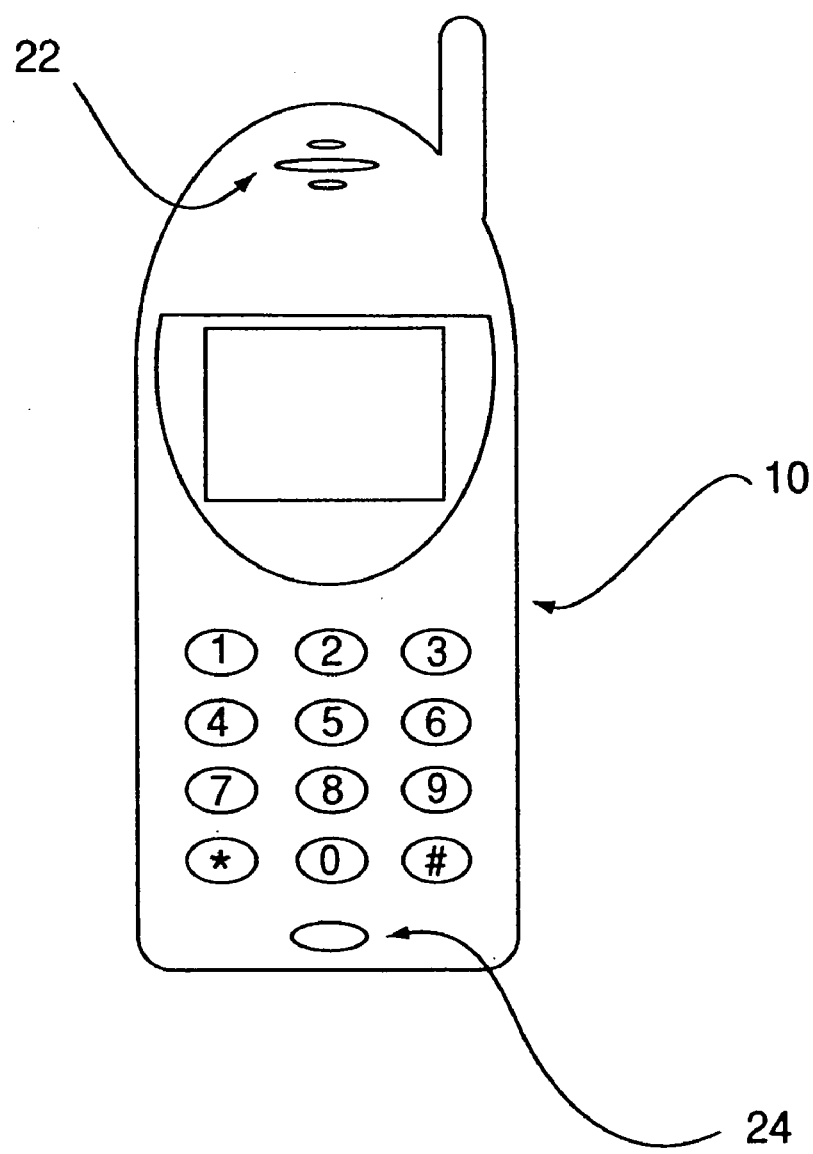
FIG. 1 is a front view of a wireless phone.
Figure 2A:
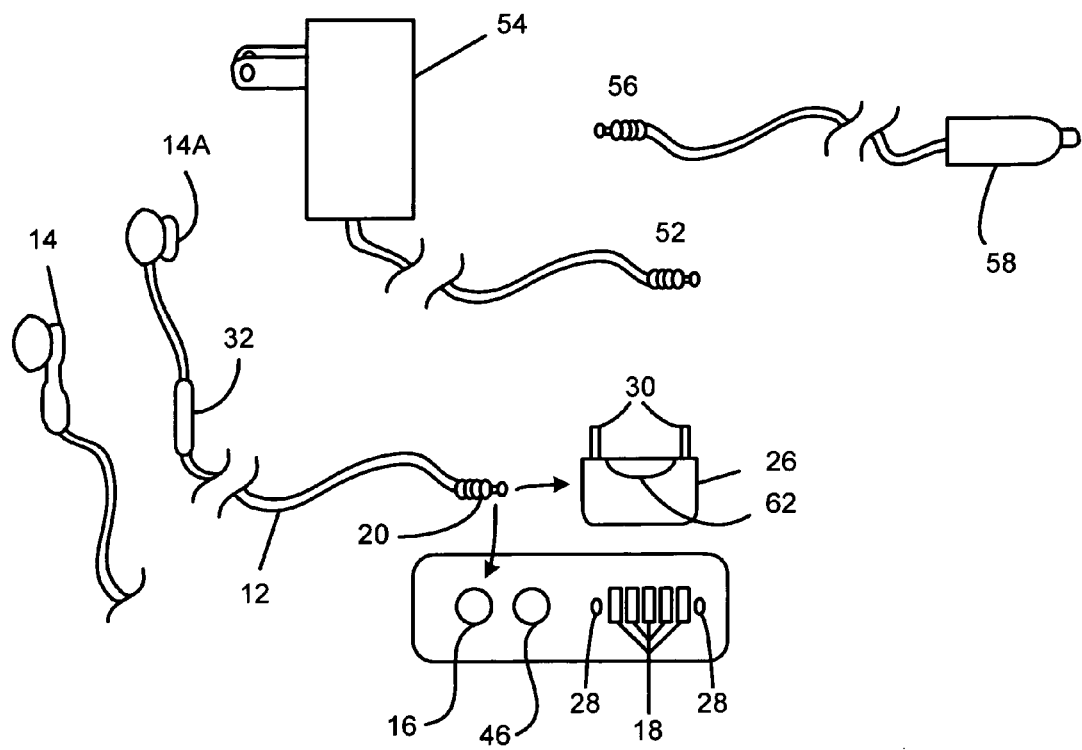
FIG. 2A is a bottom view of the cordless phone of FIG. 1 and various peripherals.
Figure 2B:
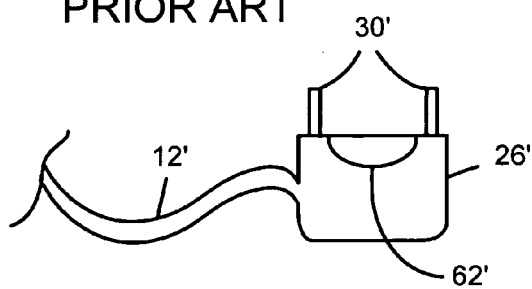
FIG. 2B is a side view of a second form of construction of the connector of FIG. 2A.

FIG. 1 shows a front view of a wireless phone 10 with a speaker 22 and a microphone 24. Typically, the user holds the phone 10 in one hand, listens through the speaker 22, and talks into the microphone 24. The phone 10 can also be used in conjunction with a combined speaker/microphone earpiece 14 (see FIGS. 2A and 2B) coupled at the distal end of a cable 12 or 12'. The combined speaker/microphone earpiece 14 can be inserted in a user's ear. The combined speaker/microphone earpiece 14 picks up the sound of the user's voice from the vibrations of their jawbone. A combined speaker/microphone earpiece is available from M-squared Inc. under the name EARHUGGER®. The proximal end of the cable 12 may include a jack 20 for insertion into a receptacle 16 in the base of the phone 10 as shown in FIGS. 2A and 2B. Alternatively, the jack 20 can be coupled to the phone 10 using a connector 26. The proximal end of the cable 12' may include a connector 26' for coupling to the phone 10.

Conductors enclosed in the cables 12 and 12' extend from the proximal end to the distal end. The combined speaker/microphone earpiece 14 allows the user to carry on a hands free conversation while the phone is secured about the user's waist.

Alternatively, a speaker earpiece 14A can be located at the distal end of the cable 12 or 12' and a separate microphone 32 can be located along the cable a spaced distance from the speaker earpiece 14A.

Also located on the base of the phone 10 is a plurality of terminals 18. These terminals 18 allow the battery to be charged when the phone 10 is inserted in a charger, allow the user to insert the phone 10 in a cradle for use in a hands-free car phone set up, allow the phone to send and receive data to other devices, or allow the combined speaker/microphone earpiece 14 or separate speaker earpiece 14A and microphone 32 to be coupled to the phone 10 using connector 26 or 26'. The connectors 26 and 26' may include a release mechanism 62 and 62' to allow the connector to be released from the phone 10. The connectors 26 and 26' have a pair of mechanical fasteners 30 for securing the connector 26 and 26' to the phone 10. The mechanical fasteners 30 fit in openings 28 in the base on phone 10.

The phone 10 can be charged using either an AC/DC transformer 54 or a DC cigarette lighter adaptor 58. The transformer 54 and the adaptor 58 can be connected to the phone 10 with jack 52 and 56 respectively. The jacks 52 or 56 can be inserted in to a receptacle 46 in the base of the phone 10. The location of the receptacles 16 and 46 and the location and quantity of terminals 18 may vary from manufacture to manufacture. A problem with the combined speaker/microphone earpiece 14 being located on a cable 12 as mentioned above is that the length of cord is rarely the length the user desires and there is no convenient place to store the cable when not in use.

Figure 3:
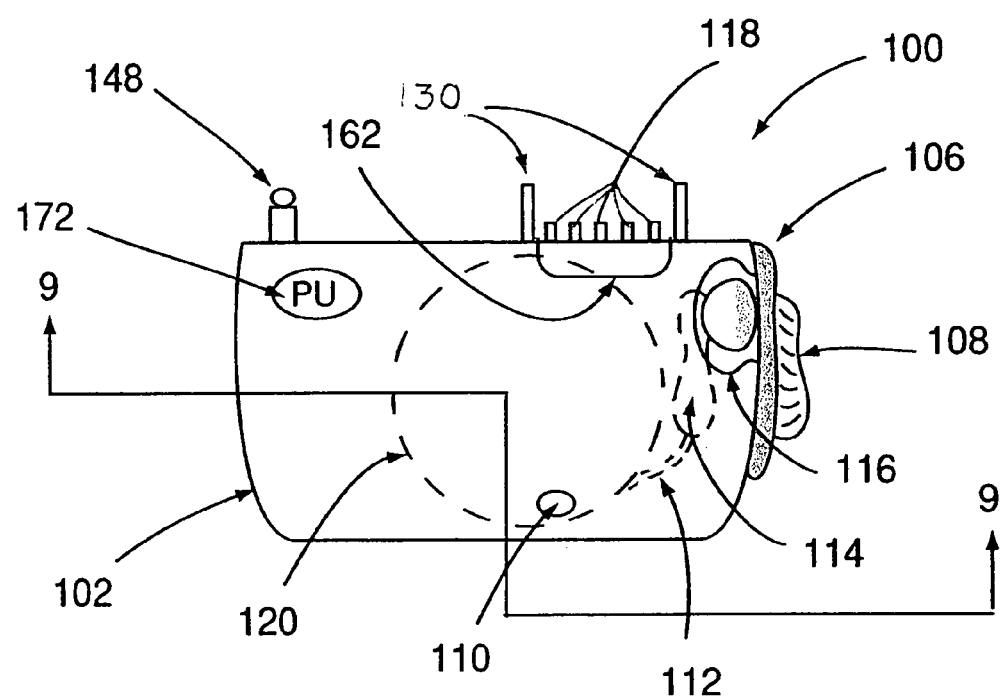
FIG. 3 is front view of a first embodiment of a cable retractor assembly consistent with the present invention.

FIG. 3 shows a front view of a first embodiment of a cable retractor assembly 100 coupleable to a portable electronic device. The portable electronic devices may be one of an AM/FM radio, a CD player, an MP3 player, a cassette player, a personal digital assistant, a computer, a cordless phone, a radiophone, and a cellular phone.

Figure 3A:
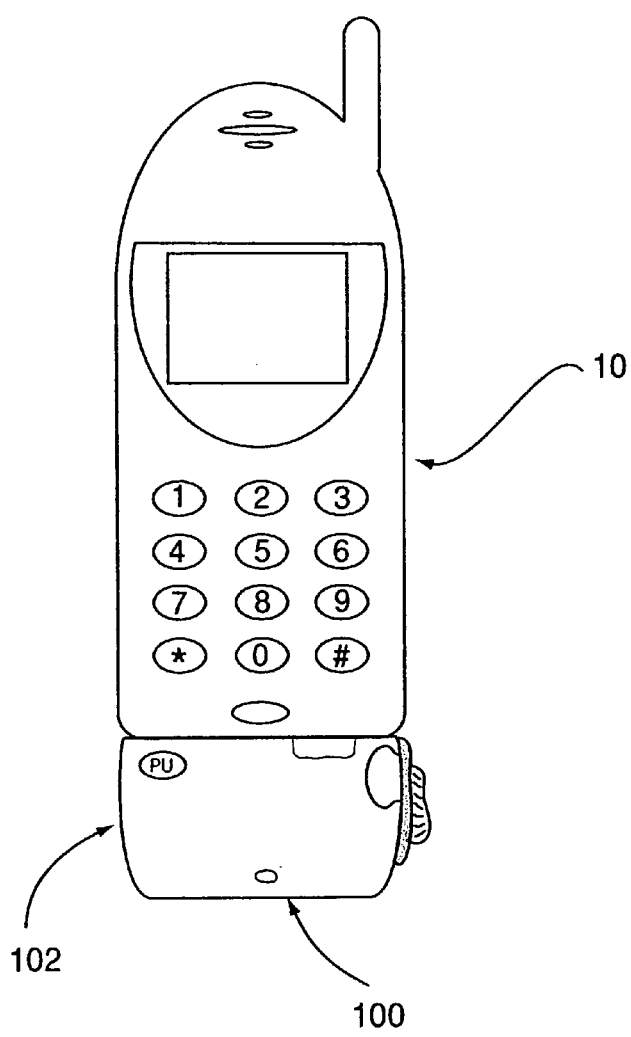
FIG. 3A is a front view of the cable retractor assembly of FIG. 3 coupled to the wireless phone of FIG. 1.

FIG. 3A shows the cable retractor assembly 100 coupled to the wireless phone 10 of FIG. 1. The cable retractor assembly 100 is shown extending generally downward from the base of the phone 10.

Figure 3B:
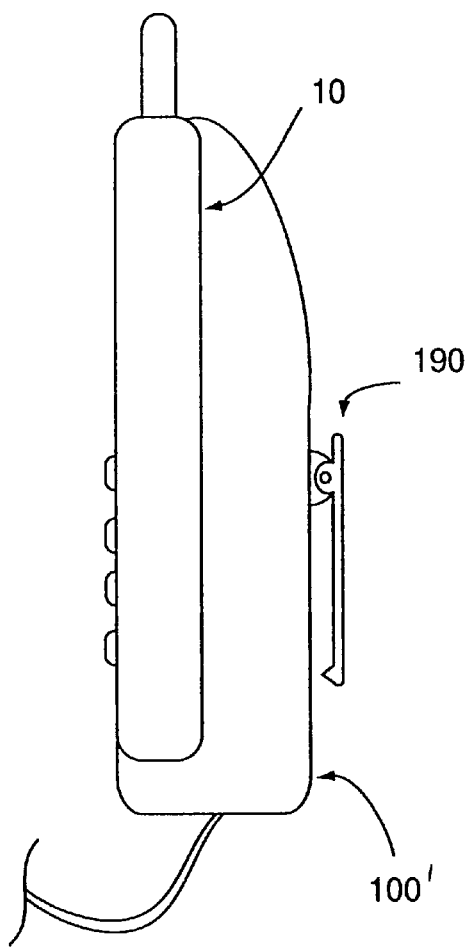
FIG. 3B is a side view of a second embodiment of a cable retractor assembly consistent with the present invention coupled to the wireless phone of FIG. 1.

FIG. 3B shows a second embodiment of a cable retractor assembly 100' coupled to wireless phone 10 of FIG. 1, the cable retractor assembly extending generally rearward of the phone 10. The cable retractor may optionally include a clip 190 for securing the retractor and phone to a user's belt or waistline.

As shown in FIGS. 3, 4, 5, and 6, the cable retractor assembly 100 is shown in an enclosure 102. The cable retractor assembly 100 comprises a plurality of terminals 118 for electrically coupling the cable retractor assembly 100 to a portable electronic device, a printed circuit board 150 with conductive traces for coupling various electrical and mechanical components including the terminals 118 and 18B, a rotatable reel 120 for reeling a length of a cable 112 with a combined speaker/microphone earpiece 114 or speaker earpiece 114A and microphone 132, a biasing member 246 (see FIG. 11) for causing the reel 120 to rotate in a predetermined direction, a combined speaker/microphone earpiece 114, a locking mechanism 106 for resisting winding and unwinding of the cable 112, a pair of mechanical fasteners 130 for securing the enclosure 102 to a portable electronic device, and a release mechanism 162 for releasing the cable retractor from a portable electronic device.

The mechanical fasteners 130 can be designed to give the user the ability to repeatably couple and decouple the cable retractor 100 to a portable electronic device. Many different types of suitable mechanical fasteners can be used to couple these components together. Mechanical fasteners are well known to those in art, a detailed explanation will therefore be omitted. In the embodiment shown in FIG. 3, the plurality of terminals 118 are capable of being coupled to the plurality of terminals 18 (see FIG. 2) on the base of phone 10. The mechanical fasteners 130 fit in openings 28 (see FIG. 2) in the base of phone 10. An optional jack 148 may be electrically coupled through the printed circuit board 150 to an optional receptacle 146 located on the base of the retractor 100. The electrically coupled jack 148 and the receptacle 146 allow the user to charge or power the phone 10 without having to remove the retractor 100 from the phone 10. In an alternative embodiment, the cable retractor and the portable electronic may share a common enclosure (i.e. not capable of being decoupled). The cable retractor assembly 100 may further optionally comprise a microphone 110 electrically coupled to the plurality of terminals 118 through printed circuit board 150.

A molded cradle 116 may be formed in the enclosure 102 to hold the combined speaker/microphone earpiece 114 or speaker earpiece 114A when not in use. The earpiece 114 can be secured in the cradle 116 with the locking mechanism 106. The earpiece is coupled to the plurality of terminals 118 through a cable 112 that is wrapped around the reel 120. The locking mechanism 106 may include a contoured grip portion 108. The locking mechanism 106 is shown protruding from the side of the enclosure 102. Alternatively, the locking mechanism can be designed not to protrude from the side of the enclosure 102.

Alternatively, the cable retractor assembly comprises an actuator 172. The actuator may be electrically coupled though the printed circuit board to terminal 118 on the topside of the enclosure 102. In the event the coupled wireless phone 10 receives an incoming call, the user can simply actuate the actuator 172 to pick up the incoming call.

Alternatively, the cable retractor assembly comprises a sensor 176 for sensing movement of the cable 112 or rotation of reel 120. The sensor may be a Hall effect sensor or an optical sensor secured to a printed circuit board 150. Methods for sensing motion are well known in the art. When motion or rotation is sensed, the coupled wireless phone can be signaled through terminals 118. In the event the coupled wireless phone 10 receives an incoming call, the sensed movement or rotation can signal the wireless phone to pick up the incoming call.

Alternatively, the cable retractor comprises an actuator 174 coupled to the printed circuit board that may be actuated by the earpiece 114 or 114A when the earpiece is inserted in a cradle 116 on the enclosure 102. When the state of the actuator 174 is changed by removal of the earpiece from the cradle, the coupled wireless phone can be signaled through terminals 118 to pick up an incoming call.

Alternatively, the cable retractor assembly 100 may monitor whether the combined speaker/microphone earpiece 114 or speaker earpiece 114A and microphone 132 are extended outside the enclosure 102. When the cable retractor assembly 100 is coupled to a wireless phone or built into a wireless phone, the wireless phone can be programmed to disable the ringer on the phone whenever the combined speaker/microphone earpiece 114 or speaker earpiece 114A and microphone 32 is extended. The phone would alert the user of an incoming call through the combined speaker/microphone earpiece 114 or speaker earpiece 114A. Alternatively, the wireless phone can be programmed to signal the user by causing a vibrator in the enclosure to vibrate whenever there is an incoming call and the combined speaker/microphone earpiece 114 or speaker earpiece 114A and microphone 32 are extended.

By having the cable retractor electrically coupleable to the wireless phone, the wireless phone can be programmed to respond differently depending on the state of the combined speaker/microphone earpiece 114 or speaker 114A and microphone 32.

Figure 4:
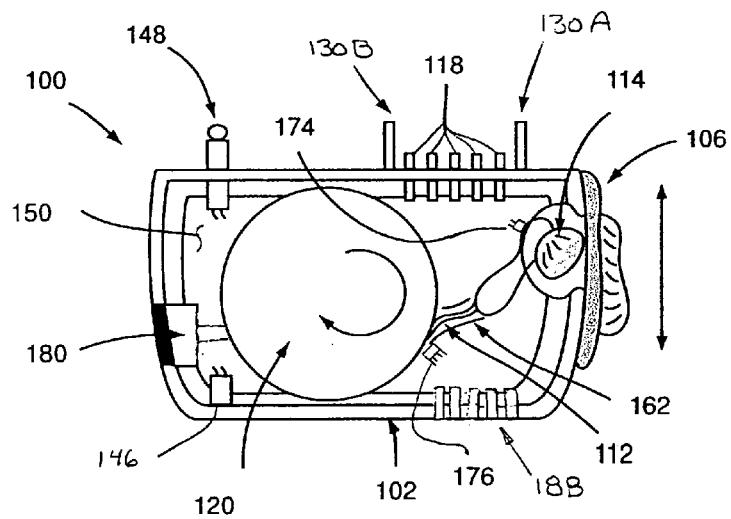
FIG. 4 is a first section view of the cable retractor assembly taken along line 4—4 of FIG. 6.

In the embodiment shown in FIG. 4, the earpiece 114 or 114A is secured in the enclosure 102 by the locking mechanism 106. To decouple the earpiece from the enclosure 102, the user can urge the locking mechanism 106 downward. Alternatively, the enclosure 102 can be designed to allow the earpiece to snap in to the enclosure without the need for the locking mechanism 106.

Figure 5:
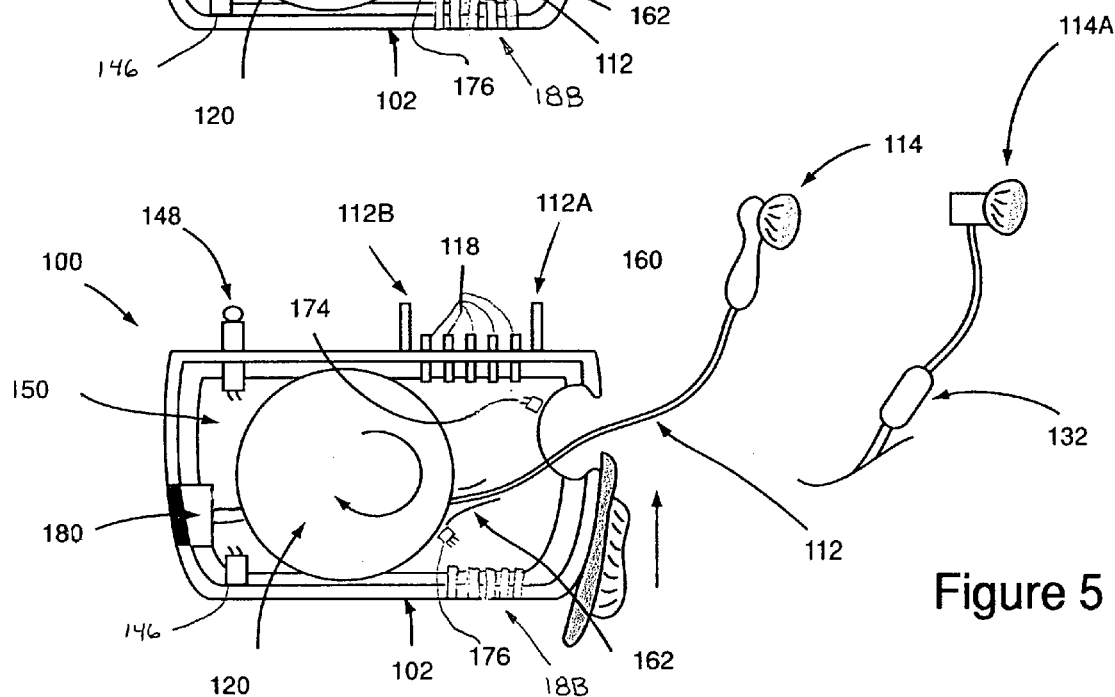
FIG. 5 is a second section view of the cable retractor assembly taken along line 4—4 of FIG. 6.

In the embodiment shown in FIG. 5, the combined speaker/microphone earpiece 114 is shown tethered to the cable retractor assembly 100 by cable 112. Alternatively, the speaker earpiece 114A and microphone 132 can be tethered to the cable retractor assembly 100.

Figure 7:
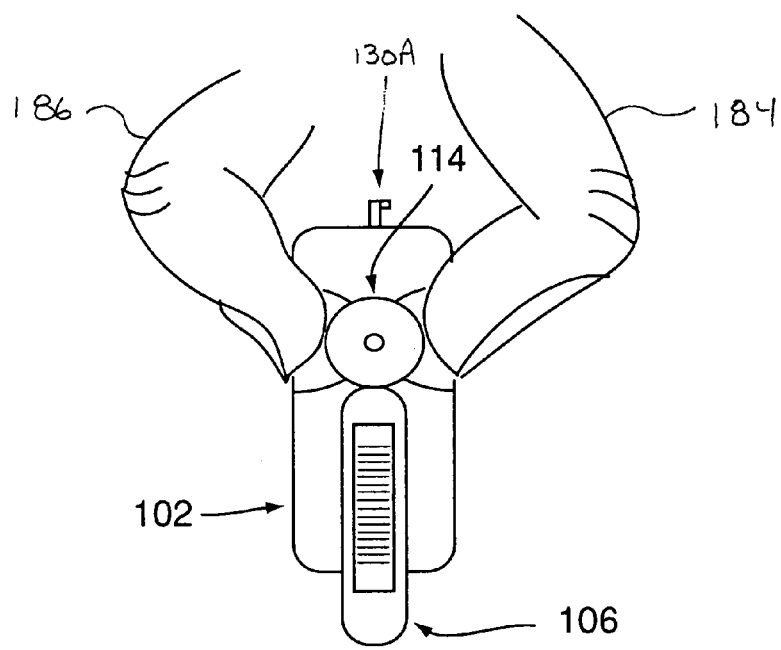
FIG. 7 is a first right side view of the cable retractor assembly of FIG. 3.
Figure 8:
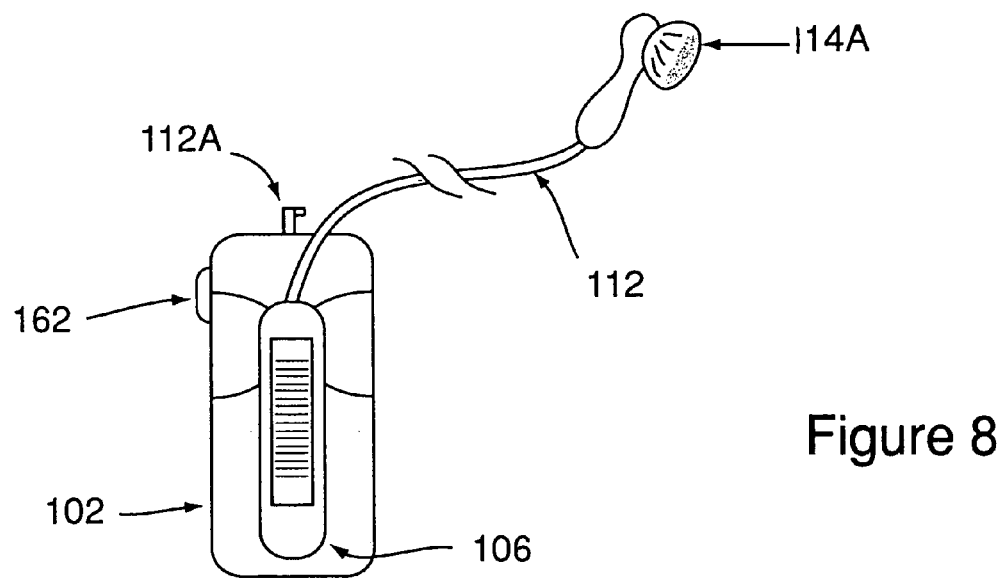
FIG. 8 is a second right side view of the cable retractor assembly of FIG. 3.

As shown in FIG. 7, the combined speaker microphone earpiece 114 or speaker earpiece 114A can be decoupled from the enclosure 102 by exerting force on the earpiece with the operators fingers 184 and 186 and pulling away from the enclosure 102. After the user has decoupled the earpiece from the enclosure 102 and unreeled the desired length of cable 112 by urging the earpiece away from the enclosure 102, the user can urge the locking mechanism 106 upward to the position shown in FIG. 8. The cable 112 extends from the reel 120 along a passageway 162 and exits the enclosure 102 through an opening 160. The passageway 162 and the opening 160 can be sized to allow the microphone 132 to be retracted inside the enclosure 102 when used with the speaker earpiece 114A. By urging the locking mechanism 106 upward, the locking mechanism 106 compresses the cable 112 against the side of opening 160. An alternative locking mechanism can resist motion of the cable 112 by resisting rotational motion of the reel 120.

Figure 10:
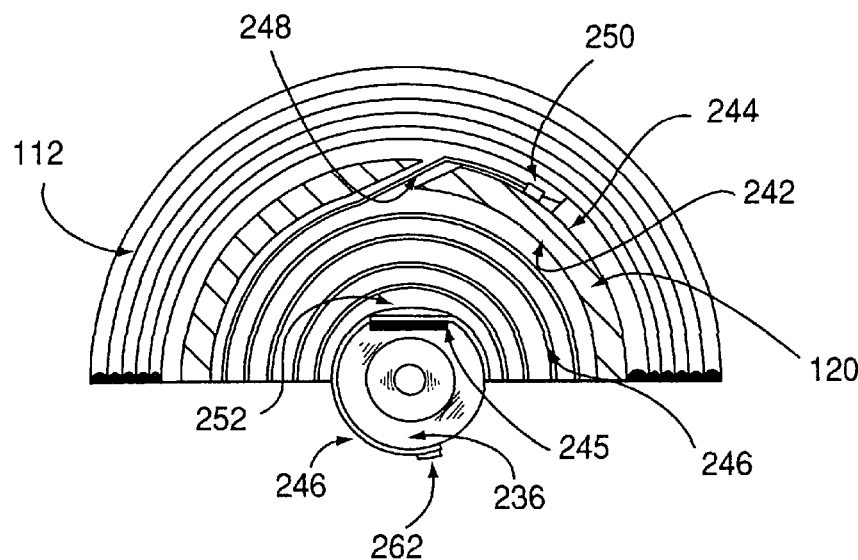
FIG. 10 is a partial section view of a cable retractor consistent with the present invention.
Figure 11:
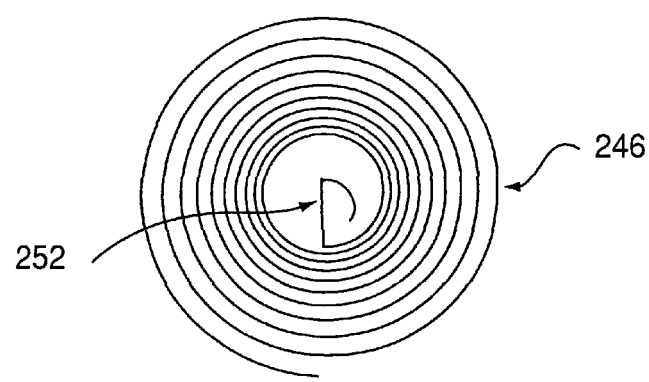
FIG. 11 is a top view of a first embodiment of a biasing member consistent with the present invention.

In the embodiment shown in FIGS. 4 and 5, the reel 120 is urged to rotate clockwise by a biasing member 246 (shown in FIGS. 10 and 11). In this embodiment, the biasing member 246 constantly urges the reel to rotate. Alternatively, the combined speaker/microphone earpiece 114 or speaker earpiece 114A can be secured in a cradle on the exterior of the enclosure 102. The earpiece and the cradle can be designed to allow the earpiece to snap into the cradle. Alternatively, the earpiece and the cradle can be designed to require that the earpiece be rotated, for example 90°, prior to removal from the cradle.

In an alternative embodiment, the cable retractor assembly 100 includes a ratchet and pawl mechanism and a release mechanism 180. As the user urges the combined earpiece/mouthpiece 114 or speaker earpiece 114A from the enclosure 102, the ratchet prevents the cable 112 from being retracted into the enclosure 102 when the user releases the earpiece or the cable 112. By actuating the release mechanism 180, the cable 112 is retracted on to the reel 120. Many different types of suitable ratchet mechanisms and release mechanisms can be coupled to the reel 120 or cable 112. Ratchet mechanisms and release mechanisms are well known to those in the art, a detailed explanation will therefore be omitted. U.S. Pat. No. 6,059,213 entitled Reel Device discloses a ratchet and pawl mechanism and a release mechanism suitable for use in the present invention. The '213 patent is incorporated herein by reference in its entirety.

Figure 6:
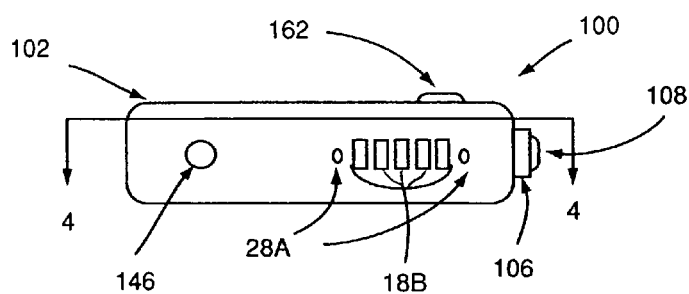
FIG. 6 is a bottom view of the cable retractor assembly of FIG. 3.

As shown in FIG. 6, the cable retractor 100 may include a plurality of terminals 18B and openings 28A on its base. The terminals 18B can be electrically coupled to the terminal 118 located on the topside of the enclosure 102 through the printed circuit board 150. These terminals on the base of the cable retractor allow the portable electronic device to be coupled with other devices without having to remove the cable retractor 100 from the portable electronic device. The terminals 18B allow the battery in the portable electronic device to be charged when the phone 10 is inserted in a charger, allow the user to insert the phone 10 in a cradle for use in a hands-free car phone set up, and allow the phone to send and receive data to other devices. Openings 28A allow other devices to be mechanically coupled to the cable retractor assembly 100.

Figure 9:
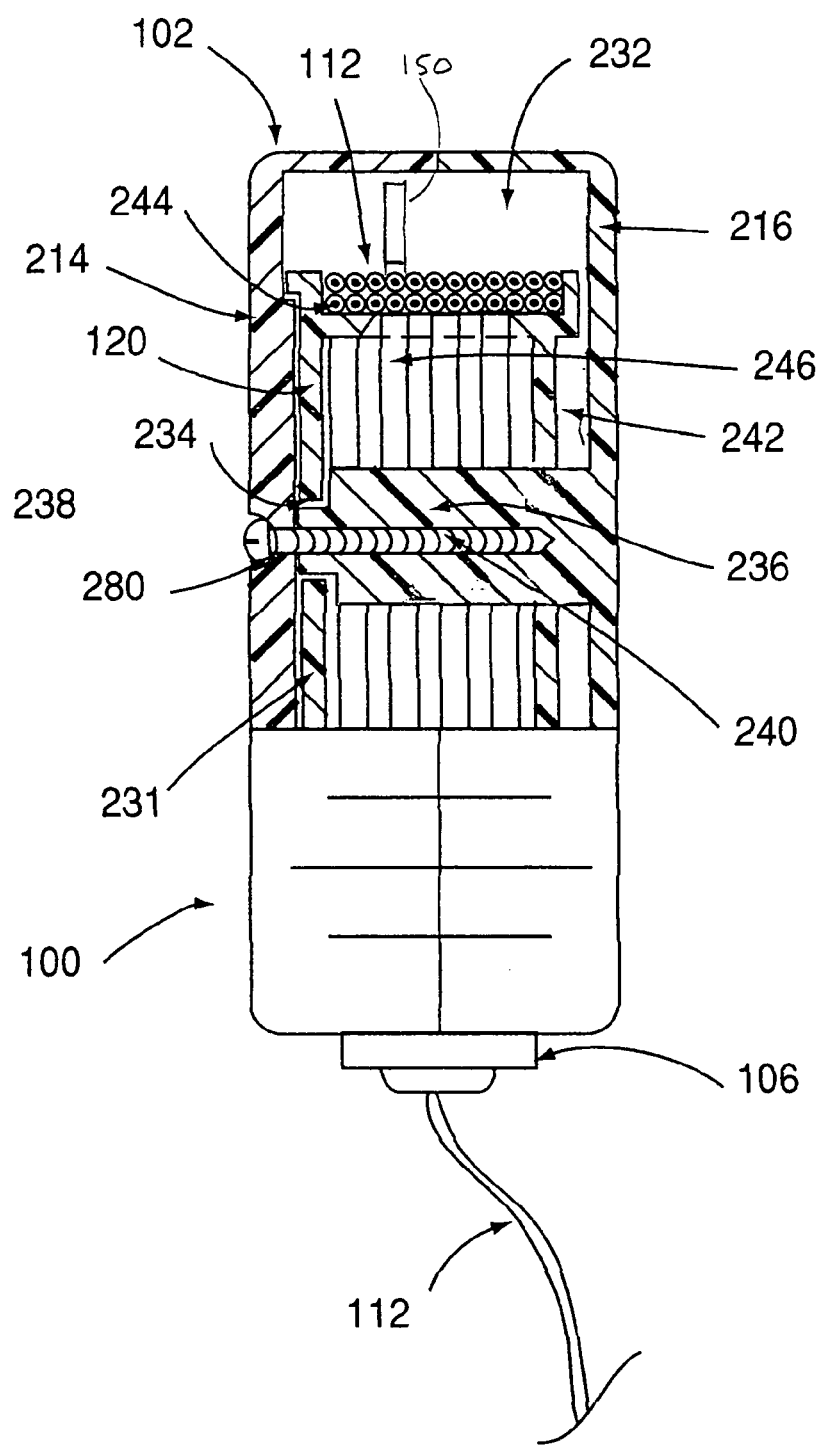
FIG. 9 is a sectional view of the cable retractor assembly taken along line 9—9 of FIG. 3.

A detailed cross-sectional view of the cable retractor assembly 100 consistent with the present invention is shown in FIG. 9. A reel 120 is rotatably mounted within a cavity 232 within the housing 102. More specifically, the side 231 of the reel 120 is provided with a hole 234 acting as a sleeve, which receives a hub 236 extending inwardly from side 216 of the housing 102. A screw 240 passes through a hole 280 in the side 214 of housing 102 into the hub 236 to provide a pivotal axis for rotation of the reel 120.

The reel 120 is constructed with a spool wall 244, preferable circular in shape, which together with the outer surface of the hub 236 defines a circular cavity 242. A spiral spring connector 246 is disposed within the cavity 242. As shown in FIGS. 10 and 11, a first end of the spiral spring connector 246 is coupled to the reel 120 and the second end of the spiral spring connector 246 is coupled to the hub 236. Specifically, an outer end of the spiral spring connector 246 passes through an opening 248 in the spool wall 244, and connects the retractable cable 112 at electrical connection 250. For example, the end of the spiral spring connector 246 can be soldered, as shown, to the end of the retractable cable 112. An opposite end of the spiral telephone connector 246 is connected to the housing 102. Specifically, an inner end of the spiral spring connector 246 is bent at approximately ninety (90) degrees and fits into a slot 245 in the hub 236, as shown in FIGS. 10 and 11, to anchor that end of the spring from movement within the housing 102 during a winding operation. The conductors in the spiral spring connector 246 are coupled to the printed circuit board 150 by connector 262.

The spiral spring connector 246 is shown removed from the cavity 242 of the reel 120 in FIG. 11. The spiral spring connector 246 is shown in an unwound mode with space between adjacent surfaces thereof. Upon rotating of the reel 120 during use, the spiral spring connector becomes wound tightly with adjacent surfaces thereof coming into contact with each other. The spiral spring connector 246 provides means for retracting the cable 112 by winding the reel 120 when the cable 112 is at least partially extracted for the cable retractor 100.

A first embodiment of the construction of the spiral spring connector according to the present invention is as follows. Two (2) copper telephone wires are each made from a flat sheet of copper of 0.062 inch in width and 3 mils (1/1000 inch) in thickness. The two (2) telephone wires are arranged parallel and side-by-side with a spacing of 100 centers, and then laminated between two (2) pieces of MYLAR of 2 mils thickness with a hot glue adhesive sprayed on the inside surfaces of the MYLAR prior to the lamination step. To this assembly a laminating pressure is applied which causes the copper wires to adhere to the MYLAR, which in the assembly acts as an insulator. Additional conductor may be provided if necessary. U.S. Pat. No. 5,241,593 entitled Telephone and Telephone Cord Retraction Device and Method of Making discloses a suitable retractor coil for use in the present invention, the '593 patent is herein incorporated by reference in its entirety.

It should be understood that, while the present invention has been described in detail herein, the invention can be embodied otherwise without departing from the principles thereof, and such other embodiments are meant to come within the scope of the present invention as defined in the following claim(s):

The invention claimed is:

1. A cable retractor assembly coupleable to a communications device, comprising:
   an enclosure for housing a rotatable reel, wherein the enclosure is detachably coupleable to the communications device;
   a biasing member coupled to the reel and the enclosure for urging the reel to rotate in a predetermined direction;
   an actuator coupled to the enclosure to signal the communications device to pick up an incoming call; and
   a vibrator designed to vibrate when the actuator picks up the incoming call and the biasing member is rotated in a direction opposite the predetermined direction.

2. The cable retractor assembly of claim 1, wherein the communications device is a wireless phone.

3. The cable retractor assembly of claim 1, wherein the communications device is a cellular phone.

4. The cable retractor assembly of claim 1, further comprising a terminal for coupling the signal to the coupleable communications device.

5. The cable retractor assembly of claim 1, further comprising a speaker coupled to a cable for generating sound waves, the cable coupled to the reel.

6. A cable retractor assembly coupleable to a portable communications device, comprising:
   a communications circuit for sending and receiving wireless communications signals;
   a cable retractor assembly for retracting a coupled cable, the cable comprising a first end and a second end, the first end coupled to the communications circuit and the second end comprising a speaker;
   an enclosure for housing the communications circuit and the retractor, wherein the enclosure is detachably coupleable to the communications device;
   a sensor to determine if the coupled cable is extended or retracted from the communication device, and
   a micro controller programmed to send an audio signal to the speaker when the communications circuit receives a wireless communications signal and the sensor determines the coupled cable is extended from the communication device.

7. The cable retractor assembly coupleable to a portable communications device of claim 6, further comprising a microphone coupled to the cable a spaced distance from the speaker.

8. The cable retractor assembly coupleable to a portable communications device of claim 7, further comprising an enclosure for housing the speaker and a microphone.

9. A cable retraction assembly, comprising:
   a reel rotatable about an axis for the winding and unwinding of a cable, the cable having at least two electrical conductors;
   a biasing member coupled to the reel for urging the reel to rotate in a first direction;
   a force applicator for resisting winding and unwinding of the cable; and
   an enclosure for housing the reel, the biasing member, and the force applicator wherein the enclosure is detachably coupleable to an electronic device having an alert device wherein the cable retraction assembly deactivates the alert device when the cable is unwound from the reel.

10. The cable retraction assembly of claim 9, further comprising a speaker coupled to the cable for generating sound waves.

11. The cable retraction assembly of claim 10, further comprising a microphone coupled to the cable for detecting sound waves.

12. The cable retraction assembly of claim 9, wherein the electronic device is a portable communications device.

13. A cable retractor, comprising:
   an enclosure detachably coupleable to a portable electronic device;
   a rotatable reel;
   a biasing member secured to the enclosure and the reel to urge the reel to rotate in a predetermined direction;
   a length of cable having a first end and a second end, the first end coupled to the reel and the second end having a speaker coupled thereto;
   a plurality of terminals secured to the enclosure, the terminals electrically coupled to the first end of the cable and electrically coupleable to the portable electronic device;
   a communications circuit for sending and receiving wireless communications signals;
   a sensor to determine if the biasing member is rotated in a direction opposite the predetermined direction; and
   a micro controller programmed to send an audio signal to the speaker when the communications circuit receives a wireless communications signal and the sensor determines the biasing member is rotated in the direction opposite the predetermined direction.

14. The cable retractor of claim 13, further comprising a microphone coupled to the cable for detecting sound waves.

15. The cable retractor of claim 13, wherein the portable electronic device is a selected one of a AM/FM radio, a CD player, an MP3 player, a cassette player, a personal digital assistant, a computer, a cordless phone, a radio phone, and a cellular phone.

16. A portable communications device, comprising:
a cable with a proximal end and a distal end;
an earpiece coupled to the distal end of the cable;
a cable retractor for retracting the cable in a predetermined direction and coupled to the proximal end of the cable;
a sensor to determine if the biasing member is rotated in a direction opposite the predetermined direction;
a ringer coupled to the portable communication device;
a circuit for determining the presence of an incoming call; and
a micro controller programmed to deactivate the ringer when the circuit determines the presence of the incoming call and the sensor determines the biasing member is rotated in a direction opposite the predetermined direction.

17. The portable communications device of claim 16, further comprising:
a vibrator coupled to the portable communication device wherein the micro controller is programmed to activate the vibrator when the circuit determines the presence of the incoming call and the sensor determines the earpiece is extended from the portable communication device.

18. The portable communications device of claim 16, wherein the micro controller is programmed to activate the ringer to send an audio signal to the earpiece when the circuit determines the presence of the incoming call and the sensor determines the earpiece is extended from the portable communication device.

19. The portable communications device of claim 16, wherein the micro controller is programmed to activate the ringer when the circuit determines the presence of the incoming call and the sensor determines the earpiece is retracted into the portable communication device.

20. The portable communications device of claim 16, wherein the micro controller is programmed to allow the incoming call to transmit to the incoming call to the earpiece when the earpiece is extended from the portable communication device.

21. The portable communications device of claim 16, further comprising one of the group consisting of: a AM/FM radio, a CD player, an MP3 player, a cassette player, a personal digital assistant, a computer, a cordless phone, a radio phone, and a cellular phone.

22. The portable communications device of claim 16, further comprising the earpiece tethered to the cable retractor.

23. The portable communications device of claim 16, further comprising the earpiece and a microphone tethered to the cable retractor.

* * * * *